United States Patent [19]

Reese

[11] Patent Number: 5,289,530
[45] Date of Patent: Feb. 22, 1994

[54] METHOD AND APPARATUS FOR VOCALLY COMMUNICATING TO A CALLER AT A REMOTE TELEPHONE STATION SYNTHESIZED SPEECH OF STORED SPECIAL SERVICE INFORMATION

[76] Inventor: Morris Reese, P.O. Box 6651, Thousand Oaks, Calif. 91359

[21] Appl. No.: 732,781

[22] Filed: Jul. 23, 1991

[51] Int. Cl.$^5$ .................. H04M 1/57; H04M 1/64
[52] U.S. Cl. ........................ 379/88; 379/77; 379/142; 379/201
[58] Field of Search ............... 379/142, 88, 67, 201, 379/82, 79, 70, 77

[56] References Cited

U.S. PATENT DOCUMENTS

| | | | |
|---|---|---|---|
| 4,314,103 | 2/1982 | Wilson | 379/80 X |
| 4,549,045 | 10/1985 | Castro et al. | 379/82 |
| 4,782,510 | 11/1988 | Szlam | 379/88 |
| 4,930,152 | 5/1990 | Miller | 379/214 |
| 4,941,166 | 7/1990 | Waldman et al. | 379/67 |
| 4,996,704 | 2/1991 | Brunson | 379/67 |
| 5,029,200 | 7/1991 | Haas et al. | 379/89 |
| 5,101,426 | 3/1992 | Afshar et al. | 379/67 |

FOREIGN PATENT DOCUMENTS 0260255  10/1988  Japan .................. 379/88

*Primary Examiner*—Thomas W. Brown

[57] ABSTRACT

A telephone system is disclosed for remotely obtaining from a selected local telephone station audible synthesized speech representative of directory telephone numbers and/or names of previous callers stored digitally or alphanumerically in a data memory of a Caller ID interface unit at the local telephone station. The stored directory telephone numbers and/or names were previously sent to the local telephone station from terminating central office Stored Program Controlled Switching (SPCS) equipment responsively to the telephone line of the local telephone station having Caller ID service and/or other Custom Local Area Signalling System (CLASS) services which discloses a calling party directory telephone number and/or name to a called party. An apparatus, such as a telephone station set or a separate stand-alone unit connected to the telephone station set, and method are also disclosed for recalling the stored directory telephone numbers and/or names from the data memory of the Caller ID interface unit and converting the directory telephone numbers and/or names into a form which can be processed by a speech generator, for receiving the directory telephone numbers and/or names to the speech generator which converts logic signals of the directory telephone numbers and/or names into sounds to audible synthesized speech, and for communicating the audible speech to a calling customer at a remote telephone station, in response to a predetermined command code keyed-in on the remote telephone station keypad by the calling customer.

7 Claims, 2 Drawing Sheets

METHOD AND APPARATUS FOR VOCALLY COMMUNICATING TO A CALLER AT A REMOTE TELEPHONE STATION SYNTHESIZED SPEECH OF STORED SPECIAL SERVICE INFORMATION

BACKGROUND OF THE INVENTION

1. Field of the Invention

This invention relates to a telephone system for remotely obtaining audible speech of a directory telephone number and/or name (hereinafter sometimes referred to as "special service information" or "DN") of a previous caller stored digitally or alphanumerically in a data memory at a selected local telephone station. More particularly, this invention relates to a telephone station set which automatically recalls digitally or alphanumerically stored special service information from a data memory, converts the special service information into synthesized speech and communicates audible speech of the special service information to a caller at a remote telephone station, in response to a predetermined "DN command code" keyed-in on a keypad at the remote telephone station by the caller.

2. Description of the Prior Art

The invention disclosed in the Continuation-In-Part application of Morris Reese, Ser. No.07/691,492, entitled "Apparatus For Use With Caller ID System", filed on Apr. 25, 1991, discloses a telephone apparatus for receiving, displaying and storing to memory a calling party's directory telephone number and/or name sent from telephone or cellular company terminating central office Stored program Controlled Switching (SPCS) equipment responsively to a called party who subscribes to any Custom Local Area Signalling System CLASS) service, i.e. Caller ID, Automatic Recall, Who Called Me?, Automatic Callback and Screening List to name a few, which discloses a calling party's directory telephone number and/or name to the called party. The telephone apparatus also permits the called party to press a recall button on the apparatus to "recall a stored DN from a memory" for display in a LED display unit built into or connected to the apparatus, and permits the called party to press a digit on the telephone apparatus keypad corresponding to a stored directory telephone number to be automatically dialed to return a missed call.

The invention disclosed in the Re-Issue application of Morris Reese, (serial No. not received from patent office prior to the filing of this present application), entitled "Enhanced Calling Number Delivery Service and System", filed on Apr. 8, 1991, discloses a telephone system and process for transmitting a caller's directory telephone number and/or name, or a keyed-in telephone number and/or name, over a called customer busy, idle or inuse telephone line to be received and stored to an improved telephone apparatus for "later recall, display and automatic or manual dialing of the stored directory or keyed-in telephone number to return a missed call".

While a technical advance is achieved by each telephone apparatus disclosed in the aforementioned inventions, both telephone apparatuses requires on-hand operation by the called customer, e.g. to press the recall button on the telephone apparatus, to "recall a stored directory or keyed-in telephone number from memory" to review a missed call.

SUMMARY OF THE INVENTION

In accordance with the teaching of this invention, I provide the customer who subscribes to Caller ID service and to any other CLASS service with an enhanced service which allows the customer who has access to a pushbutton type phone to dial from any remote telephone station his or her phone number to access and interact with his or her local telephone station set to obtain audible speech representative of directory telephone numbers and/or names of previous callers stored digitally or alphanumerically in a data memory. I also provide the customer who subscribes to Caller ID and to any other CLASS service with an improved telephone station set which recalls digitally or alphanumerically stored directory telephone numbers and/or names of previous callers from a data memory, converts the directory telephone numbers and/or names into audible speech and communicates the audible speech representative of the directory telephone numbers and/or names to the customer at a remote telephone station, in response to a predetermined "DN command code" keyed-in on a keypad at the remote telephone station by the customer.

A first operation of this invention is when the customer at a remote telephone station dials a phone number which accesses his or her local telephone station. When a ringing signal representative of the incoming call is detected by a ring detector at the local telephone station, a microprocessor at the local telephone station responds to the receipt of the ringing signal by incrementing a ring counter at the local telephone station each time a ringing signal is detected on the line until a preselected number of rings are counted or until the incoming call is answered.

If an on off-hook detector at the local telephone station detect an off-hook condition at the local telephone station prior to the expiration of, e.g. "4" rings, the microprocessor clears the ring counter, and all non-permanent registers and timers are reinitialized to a starting state for the next incoming call. Alternately, if an off-hook condition is not detected, the ring counter continues to count rings. However, if "4" rings are counted, and when an answering machine is connected to the line of the local telephone station or built into the local telephone station set, the answering machine, which is preprogrammed to answer incoming calls after "4" rings, automatically answers the incoming call with a recorded message while the on/off-hook detector monitors the local telephone station for the detection of an off-hook condition.

The conventional audible tone communicated from the answering machine indicating the end of the recorded message also signifies to the customer at the remote telephone station to "leave a voice message", to key-in a "code key" on a keypad at the remote telephone station to retrieve recorded messages of previous callers, and/or to key-in a "DN command code" on the keypad at the remote telephone station to obtain audible speech of directory telephone numbers and/ or names of previous callers which were previously sent from terminating central office Stored Program Controlled Switching (SPCS) equipment and stored digitally or alphanumerically in a data memory at the local telephone station.

If the on/off-hook detector detect an off-hook condition at the local telephone station during or after the recorded message to the customer at the remote telephone station due to the incoming call being answered, the microprocessor clears the ring counter, and all non-permanent registers and timers are re-initialized to the starting state for the next incoming call. However, if an off-hook condition is not detected, the microprocessor enables a DTMF receiver-decoder at the local telephone station which detects for the presence of a "DN command code" on the line. Assuming that a "DN command code" is not detected, the microprocessor determines that the incoming call has been answered and/or a stop button on the answering machine has been pressed. The ring counter is cleared and all non-permanent registers and timers are re-initialized to the starting state for the next incoming call. Alternately, assuming that a "DN command code" is detected, the microprocessor enables a call progress detector at the local telephone station which detects for the presence of dial tone on the line due to the customer at the remote telephone station hanging up.

If the call progress detector detect the presence of dial tone or other signalling tones on the line indicating that the customer at the remote telephone station has hungup, the microprocessor initiates an on-hook condition at the local telephone station. However, if dial tone and other signalling tones are not detected on the line, the microprocessor recalls the stored directory telephone numbers and/or names from the data memory and converts the directory telephone numbers and/or names into a form which can be processed to produce speech by a speech generator at the local telephone station. The speech generator then converts logic signals of the directory telephone numbers and/or names into audible speech and communicates the audible speech to the customer at the remote telephone station. This process continues until all directory telephone numbers and/or names stored in the data memory are communicated to the customer at the remote telephone station.

A second operation of this invention is when, e.g. "4", rings representative of an incoming call are counted by the ring counter, and assuming that an answering machine is not connected to the line cf the local telephone station nor built into the local telephone station set, the microprocessor responds to the receipt of the "4" rings by initiating an off-hook at the local telephone station. The microprocessor then enables a tone generator at the local telephone station which generates an audible tone. This audible tone signifies to the customer at the remote telephone station to key-in a "DN command code" on a keypad at the the remote telephone station to, as previously described in the first operation of this invention, obtain audible speech of directory telephone numbers and/or names stored in memory at the local telephone station.

The microprocessor enables a DTMF receiver-decoder which monitors the line of the local telephone station to detect the presence of the "DN command code" which may or may not have been keyed-in on the keypad at the remote telephone station by the customer in response to the audible tone communicated from the tone generator at the local telephone station. If the "DN command code" is not detected, the microprocessor initiates an on-hook condition at the local telephone station and clears the ring counter, and all non-permanent registers and timers are re-initialized to the starting state for the next incoming call. Alternately, if the "DN command code" is detected on the line, the microprocessor enables the call progress detector which monitors the line for the presence of dial tone and other signalling tones which signifies that the customer has terminated the call by hanging up. The remaining process of this operation is the same as previously described for the first operation of this invention.

BRIEF DESCRIPTION OF THE DRAWINGS

The invention may be better understood from the following description when read together with the drawing, in which.

DESCRIPTION OF THE PREFERRED EMBODIMENT (S)

Figure 1:
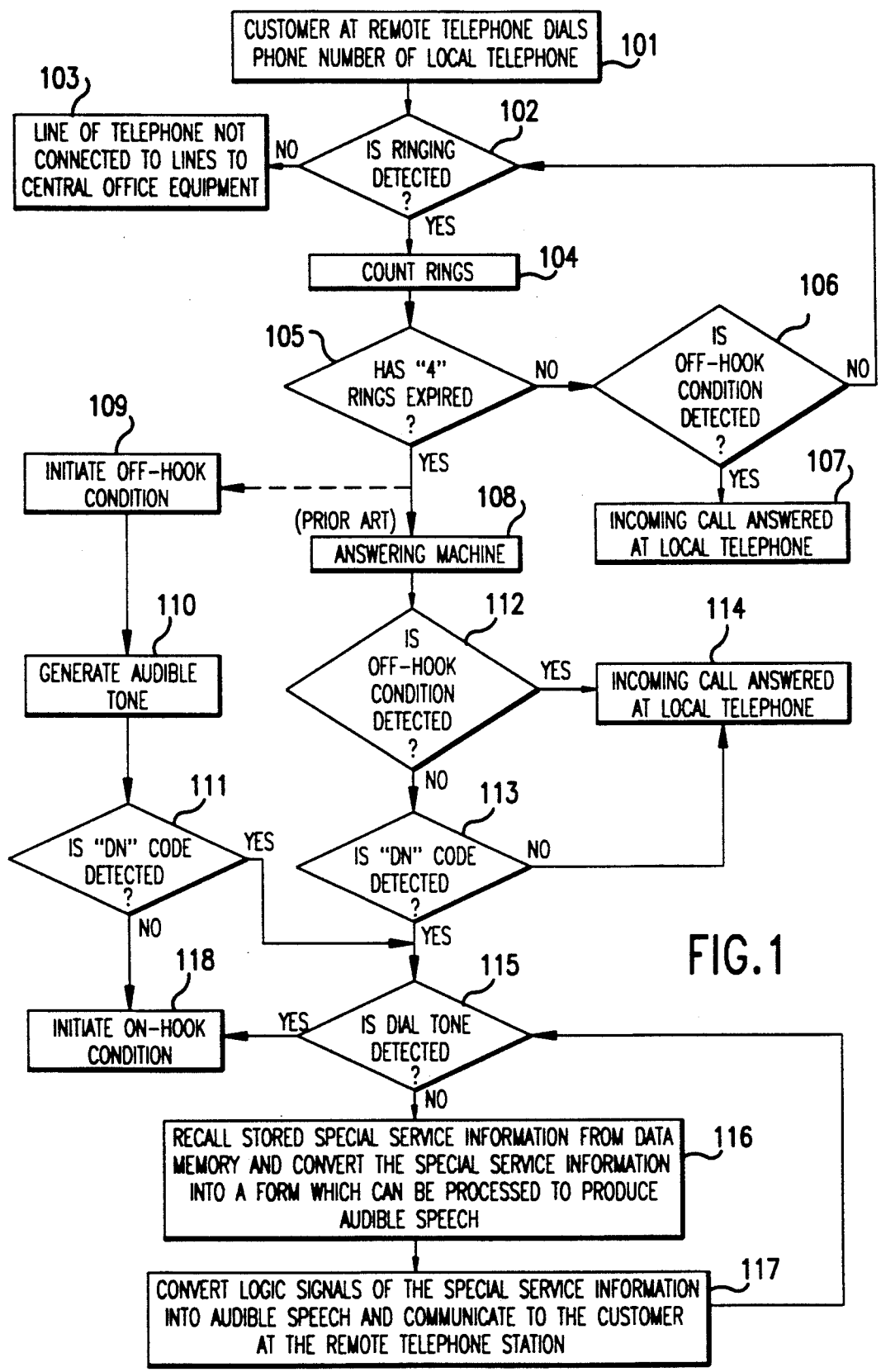
FIG. 1 shows, in flow chart form, a method for remotely obtaining audible speech of special service information stored digitally or alphanumerically in a data memory at a selected local telephone station.

The general organization of an embodiment of the invention is illustrated in the flow chart of FIG. 1, which shows a customer at a STEP 101 remote telephone station dialing the phone number of his or her local telephone station to retrieve and/or leave a recorded message on an answering machine which is built into or connected to the line of the local telephone station, and/or to obtain audible speech of directory telephone numbers and/or names (hereinafter sometimes referred to as "special service information" or "DN") of previous callers stored digitally or alphanumerically in a data memory at the local telephone station. This special service information not only includes directory telephone numbers and/or names of previous callers, but may also comprise special service indicators, personal messages, time of day for each missed call, a called station directory number and any other desired information previously sent from terminating central office Stored Program Controlled Switching (SPCS) equipment responsively to the line of the local telephone station having Caller ID service and any other Custom Local Area Signalling System CLASS service which discloses special service information to a called customer.

A decision at STEP 102 determines whether a ringing signal sent from central office equipment responsively to the phone number dialed by the customer at the STEP 101 remote telephone station is detected. If the ringing signal is not detected, STEP 103 it is assumed that the line to which the local telephone station is connected is not connected via lines to the central office equipment. However, if a ringing signal is detected, STEP 104 a microprocessor at the local telephone station increments a ring counter each time a ringing signal is detected on the line until a preselected number of rings has been counted.

A decision at STEP 105 determines whether, for example, "4" rings have been counted. If "4" rings have not been counted, STEP 106 a decision is made to determine whether an off-hook condition is detected at the local telephone station due to the call being answered. If an off-hook condition is not detected, STEP 104 via STEP 102 the ring counter continues to count rings until the preselected number of rings have been counted. However, if an off-hook condition is detected, STEP 107 the microprocesor clears the ring counter, and all non-permanent registers and timers of an apparatus at the local telephone station are reinitialized to a starting state for the next incoming call. Assuming that "4" rings have, indeed, been counted, prior art, STEP 108 an answering machine which is preprogrammed to answer incoming calls after "4" rings, automatically answers the incoming call. The conventional audible tone communicated from the answering machine indicating the end of recorded messages of previous callers, also indicates to the customer at the STEP 101 remote telephone station to key-in a "DN command code" on a keypad at the remote telephone station.

A decision at STEP 112 determines whether an off-hook condition has been detected at the local telephone station due to the incoming call being answered during or after the recorded message to the customer at the remote telephone station. If an off-hook condition is detected, STEP 114 the microprocessor clears the ring counter, and all non-permanent registers and timers of the apparatus at the local telephone station are re-initialized to a starting state for the next incoming call. Alternately, if an off-hook condition is not detected. STEP 113 a decision is made to determine whether a "DN command code" has been keyed-in on a keypad at the STEP 101 remote telephone station by the customer in response to the audible tone communicated from the STEP 108 answering machine. If the "DN command code" is not detected, STEP 114 the microprocessor clears the ring counter, and all non-permanent registers and timers of the apparatus at the local telephone station are re-initialized to a starting state for the next incoming call. In the alternate, if the "DN command code" is detected, STEP 115 another decision is made to determine whether dial tone or any other signalling tones are detected on the line due to the customer hanging up.

If dial tone or other signalling tones are detected, STEP 118 the microprocessor initiates an on-hook condition at the local telephone station and clears the ring counter, and all non-permanent registers and timers of the apparatus are re-initialized to a starting state for the next incoming call. However, if dial tone or other signalling tones are not detected, STEP 116 the microprocessor recalls the stored special service information from the data memory and converts the special service information into a form which can be processed to produce audible speech. At STEP 117, a speech generator at the local telephone station converts logic signals of the special service information into audible speech and communicates the audible speech to the customer at the STEP 101 remote telephone station. This process continues until all special service information in the data memory has been communicated to the customer.

Referring now back to STEP 105, a decision is made to determine whether the preselected number of rings has been counted. Assuming that the preselected number of rings has been counted, and assuming that an answering machine is not connected to the line of nor built into the local telephone station, STEP 109 the microprocessor initiates an off-hook condition at the local telephone station. At STEP 110, the microprocessor then enables a tone generator at the local telephone station which generates an audible tone. This audible tone signifies to the customer at the STEP 101 remote telephone station to key-in a "DN command code" on e keypad at the remote telephone station.

A decision at STEP 111 determines whether the "DN command code" has been detected on the line. If the "DN command code" is not detected, STEP 118 the microprocessor initiates an on-hook condition at the local telephone station and clears the ring counter, and all non-permanent registers and timers of the apparatus at the local telephone station are re-initialized to a starting state for the next incoming call. However, if the "DN command code" is detected, STEP 115 a decision is made to determine whether dial tone or other signalling tones have been detected on the line to which the local telephone station is connected due to the customer at the remote telephone station hanging up. If dial tone or other signalling tones are detected, STEP 118 the microprocessor initiates an on-hook condition at the local telephone station and clears the ring counter, and all non-permanent registers and timers of the apparatus at the local telephone station are re-initialized to a starting state for the next incoming call. The remaining process STEPS 116 and 117 are the same as previously described above.

Figure 2:
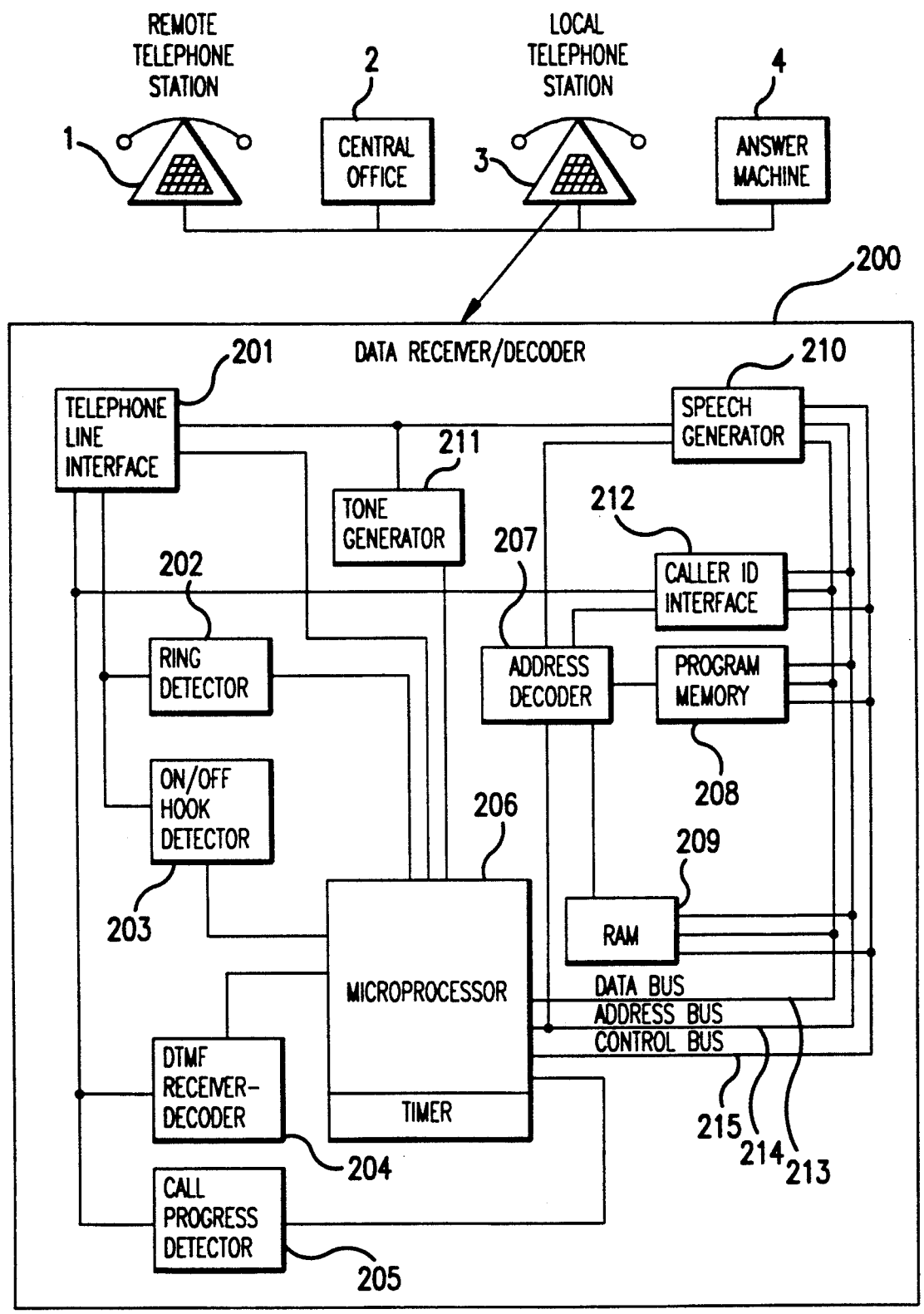
FIG. 2 shows, in block diagram form, a data receiver-decoder connectable to a telephone station set, or to a separate stand-alone unit (not shown), for performing the operations of this invention.

In FIG. 2, is shown a simple block diagram configuration of a data receiver-decoer 200. The data receiver-decoder may be built into the local telephone station 3 or connected to the local telephone station as a separate stand-alone unit. A telephone line interface 201 contains the necessary components for connection to the tip and ring leads of the local telephone station 3 which is connected to an answering machine 4 and to lines to central office equipment 2.

The data receiver-decoder 200 comprises the necessary components (blocks 201 thru 215) which allows the customer at the remote telephone station 1 to dial the phone number of his or her local telephone station 3 to retrieve and/or leave a recorded message on the answering machine 4 and/or to obtain audible speech of special service information stored digitally or alphanumerically in a data memory at the local telephone station 3. The components (blocks 201 thru 215) also permits recalling the digitally or alphanumerically stored special service information from the data memory, converting the special service information into audible speech and then communicating the audible speech to the customer at the remote telephone station 1, in response to a predetermined "DN command code" keyed-in on a keypad at the remote telephone station by the customer.

The ring detector 202 monitors the line of the local telephone station 3 for the detection of ringing signals sent from the central office 2 responsively to the dialed phone number by using a common voltage comparator or ring detector integrated circuits. The on/off-hook detector 203 includes circuitry which senses voltage at the local telephone station 3 which signifies an on-hook or an off-hook condition. The DTMF receiver-decoder 204 detects, receives and decodes a "DN command code" detected on the line of the local telephone station 3. The call progress detector 205 monitors the line of the local telephone station 3 for the detection of dial tone or other signalling tones which indicates that the customer at the remote telephone station 1 has terminated a call by hanging up. All of the aforementioned detectors outputs status data on the input port of the microprocessor 206.

The Caller ID interface 212, prior art, comprises a data memory and other necessary components (which are not duplicated in data receiver-decoder 200) for receiving, displaying and storing to the data memory special service information sent from the central office equipment 2 responsively to the line of the local telephone station 3 having Caller ID service or any other CLASS service which discloses special service information to a called customer. The Caller ID interface 212 also comprises the necessary components which are not duplicated in the data receiver decoder 200) which allows the called customer to press a predetermined recall button or digit on the local telephone station 3 to recall digitally or alphanumerically stored special service information from the data memory so as to be displayed in a LED display counter on the local telephone station 3. In addition, the components allows the called customer to press a predetermined button or digit on the local telephone station 3 to automatic dial a stored "directory telephone number" in the data memory to return a missed call. The microprocessor 206 receives and responds to a valid "DN command code" placed on its input port by the DTMF receiver-decoder 204 by executing a program in the program memory 208 which recalls the stored special service information from the data memory.

The microprocessor 206 enables the tone generator 211 which generates an audible tone which signifies to the customer at the remote telephone station 1 to key-in a "DN command code" on a keypad at the remote telephone station.

The microprocessor 206 communicates to the speech generator 210 through the address decoder 207, the address bus 214, the data bus 213, and the control bus 215 which includes read and write conductors. The speech generator receives 8 bit data (special service information) into its holding registers from the data memory of the Caller ID interface 212 and converts the 8 bit data into audible sounds to synthesized speech. This audible speech is then communicated to the customer at the remote telephone station 1.

When a ringing signal is detected on the line by the ring detector 202, the ring detector outputs status data on the input port of the microprocessor 206. The microprocessor receives the status data and responds by executing a program in the program memory 208. This program increments a ring counter of the RAM 209 each time a ringing signal is detected on the line and outputs status data to the microprocessor. On a ring count of one, a timer of the microprocessor 206 starts a count down. The timer is set to time an interval long enough to allow the ring counter to count a preselected number of rings before being cleared by the microprocessor for the next incoming call. Should the timer count to zero, all non-permanent registers, counters and timers of an apparatus at the local telephone station are re-initialized to a starting state for the next incoming call.

When an off-hook condition is detected at the local telephone station 3 by the on/off-hook detector 203 prior to the expiration of, e.g. "4" rings, the on/off-hook detector outputs off-hook status data on the input port of the microprocessor 206 which responds by clearing the ring counter of RAM 209, and all non-permanent registers and timers are re-initialized to a starting state for the next incoming call. However, when "4" rings are counted, the answering machine 4, which is built into or connected to the local telephone station 3 and preprogrammed to answer incoming calls after "4" rings, automatically answers the incoming call. When an off-hook condition is not detected at the local telephone station 3 prior to the expiration of "4" rings, and when "4" rings have not been counted, the ring counter continues to count rings.

Shpuld the on/off-hook detector 203 detect an off-hook condition at the local telephone station 3 after the answering machine 4 answers an incoming call, the on off-hook detector places off-hook status data on the input port of the microprocessor 206 which, in turn, clears the ring counter of the RAM 209, and all non-permanent registers and timers of the apparatus at the local telephone station are re-initialized to a starting state for the next incoming call. Alternately, when an off-hook condition is not detected, the microprocessor 206 enables the DTMF receiver-decoder 204 which monitors the line of local telephone station 3 for the detection of a "DN command code" which may or may not have been keyed-in on a keypad at the remote telephone station 1 by the customer in response to the audible tone communicated from the answering machine 4 indicating the end of the recorded message. When a "DN command code" is not detected by the DTMF receiver-decoder 204 after the answering machine 4 answers an incoming call, the microprocessor 206 clears the ring counter of the RAM 209, and all non-permanent registers and timers of the apparatus at the local telephone station are re-initialized to a starting state for the next incoming call. In the alternate, when a "DN command code" is detected by the DTMF receiver-decoder after the answering machine answers the incoming caller, the DTMF receiver-decoder receives and decodes the "DN command code" and then places the code on the input port of the microprocessor 206. This code represents a four bit code of one of the twelve keys on the remote telephone station 1 keypad. The microprocessor reads the four bit code and compares it with a preset code. If there is a match, the microprocessor executes a program in the program memory 208 which enables the call progress detector 205 which monitors the line of the local telephone station 3 for the detection of dial tone and other signalling tones which signifies that the customer at the remote telephone station 1 has terminated the call by hanging up.

When dial tone or other signalling tones are detected on the line of the local telephone station 3 due to the customer at the remote telephone station 1 hanging up, the call progress detector 205 places status data on the input port of the microprocessor 206 which responds by executing a program in the program memory 208. This program initiates an on-hook condition at the local telephone station 3. The microprocessor 206 then re-initializes all non-permanent registers and timers of the apparatus to a starting state for the next incoming call. In the alternate, when dial tone and other signalling tones are not detected by the call progress detector, the microprocessor 206 executes a program in the program memory 208. This program recalls stored special service information from a data memory of the Caller ID interface 212 by placing the address of the first data byte on the address bus 214. The address decoder 207 generates an enabling signal which allows the data memory to be accessed. The data memory outputs the first byte of the data addressed and places it on the data bus 213. This byte of data can represent digital, alphanumerical and other types of information.

The microprocessor 206 reads the byte of data from the data memory of the Caller ID interface 212. This data is then converted into a form which the speech generator 210 can process. The speech generator contains a processor which takes a byte of data in its holding register and converts logic signals into audible sounds to synthesized speech. For example, a binary code of "00010100" might produce the sound "twenty". Multiple logic signals can also be sent to the speech generator to construct a complete telephone number and/or to spell out a name. The microprocessor then addresses the speech generator which receives the converted data into its holding register. The speech generator then outputs a logic signal which disables the microprocessor from sending additional data to the holding register until it has finished converting the already received data into an audible signal. The speech generator asserts a signal which allows the microprocessor to transfer additional data if available. Addressing successive data locations in the data memory allows for continuing data (special service information) to be communicated, vocally, to the customer at the remote telephone station 1. This process continues until all the data in the data memory has been communicated to the customer. When dial tone or other signalling tones are detected on the line of the local telephone station 3 by the call progress detector 205 during or after the data in the data memory has been communicated to the customer, the call progress detector places status data on the input port of the microprocessor 206 which then executes a program in the program memory 208. This program initiates an on-hook condition at the local telephone station 3. All non-permanent registers and timers of the apparatus are then re-initialized to a starting state for the next incoming call.

As previously described above, the ring counter of the RAM 209 is incremented each time a ringing signal is detected on the line by the ring detector 202 until a preselected number of rings has been counted. If the preselected number of rings has, indeed, been counted, and if an answering machine is not built into nor connected to the local telephone station 3, the microprocessor 206 executes a program in the program memory 208 which initiates an off-hook condition at the local telephone station 3. The microprocessor 206 then enables the tone generator 211 which generates an audible tone. This audible tone signifies to the customer at the remote telephone station 1 to key-in a "DN command code" on the remote telephone station keypad. The DTMF receiver-decoder 204 monitors the line of the local telephone station 3 for the detection of the "DN command code" which may or may not have been keyed-in on the remote telephone station keypad by the customer in response to the generated audible tone. If the "DN command code" is not detected, the microprocessor 206 executes a program in the program memory 208 which initiates an on-hook condition at the local telephone station 3, and al 1 non-permanent registers and timers of the apparatus are re-initialized to a starting state for the next incoming call. In the alternate, if the "DN command code" is detected, the DTMF receiver-decoder receives and decodes the code and then places the code on the input port of the microprocessor 206 which then enables the call progress detector 205. As previously described above, the call progress detector monitors the line of the local telephone station 3 for the detection of dial tone and other signalling tones which signifies that the customer at the remote telephone station 1 has terminated the call by hanging up. The remaining operations and functions for this embodiment are the same as previously described herein.

While the present invention has been described in connection with preferred embodiment(s), modifications and applications which will become obvious to those skilled in the art are included within the spirit and scope of the invention.

What is claimed is:

1. A method for vocally communicating to a caller at a remote telephone station from a local telephone station synthesized speech of stored special service information of previous callers previously sent from terminating central office equipment to said local telephone station, comprising the steps of:
 (a) detecting a ringing signal representative of an incoming call from said caller at said remote telephone station;
 (b) responsive to the detection of said ringing signal, counting a preselected number of rings;
 (c) determining whether said preselected number of rings has expired;
 (d) initiating an off-hook condition at the local telephone station if the preselected number of said rings has expired;
 (e) generating an audible tone;
 (f) detecting a command code keyed-in on a telephone keypad by the caller at the remote telephone station in response to said audible tone;
 (g) responsive to the detection of said command code, monitoring the telephone line to which said local telephone station is connected to detect any dial tone that may appear thereon;
 (h) recalling stored data of said special service information from the data memory of a Caller Identification interface unit at the local telephone station and converting said stored data of the special service information into a form which can be processed to produce speech if said dial tone is not detected; and
 (i) converting logic signals of the stored data of said special service information to synthesized speech and communicating the synthesized speech to said caller at said remote telephone station.

2. Apparatus for vocally communicating to a caller at a remote telephone station from a local telephone station synthesized speech of stored special service information of previous callers previously sent from terminating central office equipment to said local telephone station, said apparatus comprising:
 (a) means for detecting a ringing signal representative of an incoming call from said caller at said remote telephone station;
 (b) means responsive to the detection of said ringing signal for counting a preselected number of rings;
 (c) means for determining whether said preselected number of rings has expired;
 (d) means for initiating an off-hook condition at the local telephone station if the preselected number of said rings has expired;
 (e) means for generating an audible tone;
 (f) means for detecting a command code keyed-in on a telephone keypad by the caller at the remote telephone station in response to said audible tone;
 (g) means responsive to the detection of said command code for monitoring the telephone line to which said local telephone station is connected to detect any dial tone that may appear thereon;
 (h) means for recalling stored data of said special service information from the data memory of a Caller Identification interface unit at the local telephone station and converting said stored data of the special service information into a form which can be processed to produce speech if said dial tone is not detected; and
 (i) means for converting logic signals of the stored data of said special service information to synthesized speech and communicating the synthesized speech to said caller at said remote telephone station.

3. A method for vocally communicating to a caller at a remote telephone station synthesized speech of stored directory telephone numbers and names of previously missed callers from a local telephone station, comprising the steps of:

(a) detecting a ringing signal representative of an incoming call from said caller at said remote telephone station;

(b) responsive to the detection of said ringing signal, counting a preselected number of rings;

(c) determining whether said preselected number of rings has expired;

(d) initiating an off-hook condition at said local telephone station if the preselected number of said rings has expired, and permitting an answering machine to answer said incoming call from the caller at the remote telephone station;

(e) detecting an off-hook condition at the local telephone station if one occurs;

(f) detecting a command code keyed-in on a telephone keypad by said caller at said remote telephone station in response to an audible tone communicated from said answering machine if said off-hook condition is not detected at said local telephone station;

(g) responsive to the detection of said command code, monitoring the telephone line to which the local telephone station is connected to detect any dial tone that may appear thereon;

(h) recalling stored data of said directory telephone numbers and names from the memory of a Caller Identification interface unit and converting said stored data into a form which can be processed to produce speech if said dial tone is not detected on said telephone line to which said local telephone station is connected; and (i) converting logic signals of the stored data representative of the directory telephone numbers and names to synthesized speech and communicating the synthesized speech to the caller at the remote telephone station.

4. Apparatus for vocally communicating to a caller at a remote telephone station synthesized speech of stored directory telephone numbers and names of previously missed callers from a local telephone station, said apparatus comprising:

(a) means for detecting a ringing signal representative of an incoming call from said caller at the remote telephone station;

(b) means responsive to the detection of said ringing signal for counting a preselected number of rings;

(c) means for determining whether said preselected number of rings has expired;

(d) means for initiating an off-hook condition at said local telephone station if the preselected number of said rings has expired, and permitting an answering machine to answer said incoming call from the caller at the remote telephone station;

(e) means for detecting an off-hook condition at the local telephone station if one occurs;

(f) means for detecting a command code keyed-in on a telephone keypad by said caller at said remote telephone station in response to an audible tone communicated from said answering machine if said off-hook condition is not detected at said local telephone station;

(g) means responsive to the detection of said command code for monitoring the telephone line to which the local telephone station is connected to detect any dial tone that may appear thereon;

(h) means for recalling stored data of said directory telephone numbers and names from the memory of a Caller Identification interface unit at said local telephone station and converting said stored data into a form which can be processed to produce speech if said dial tone is not detected; and (i) means for converting logic signals of the stored data representative of the directory telephone numbers and names to synthesized speech and communicating the synthesized speech to the caller at the remote telephone station.

5. The apparatus in accordance with claim 4, further comprising:

(a) means for continuously recalling said stored data of the directory telephone numbers and names from said memory of said Caller Identification interface unit and converting the stored data into a form which can be processed to produce said speech if the dial tone is not detected; and (b) means for continuously converting said logic signals of said stored data representative of said directory telephone numbers and names to synthesized speech and communicating the synthesized speech to said caller at said remote telephone station.

6. The apparatus in accordance with claim 4, further comprising means for initiating an on-hook condition at the local telephone station if said dial tone is detected on said telephone line to which said local telephone station is connected.

7. The apparatus in accordance with claim 4, further comprising means for resetting all counter, registers and timers of the apparatus at the local telephone station to a starting state if said off-hook condition is detected.

* * * * *